US012607068B2

(12) United States Patent
Sanders

(10) Patent No.: US 12,607,068 B2
(45) Date of Patent: Apr. 21, 2026

(54) APPARATUS FOR RESTRAINING MOVEMENT OF A LADDER

(71) Applicant: Jeffrey L Sanders, Bakersfield, CA (US)

(72) Inventor: Jeffrey L Sanders, Bakersfield, CA (US)

( * ) Notice: Subject to any disclaimer, the term of this patent is extended or adjusted under 35 U.S.C. 154(b) by 0 days.

(21) Appl. No.: 16/960,457

(22) PCT Filed: Jan. 8, 2019

(86) PCT No.: PCT/US2019/012751
§ 371 (c)(1),
(2) Date: Jul. 7, 2020

(87) PCT Pub. No.: WO2019/136468
PCT Pub. Date: Jul. 11, 2019

(65) Prior Publication Data

US 2021/0172250 A1 Jun. 10, 2021

Related U.S. Application Data

(60) Provisional application No. 62/614,863, filed on Jan. 8, 2018.

(51) Int. Cl.
*E06C 7/48* (2006.01)
*E06C 7/18* (2006.01)

(52) U.S. Cl.
CPC .............. *E06C 7/488* (2013.01); *E06C 7/188* (2013.01); *E06C 7/48* (2013.01)

(58) Field of Classification Search
CPC ... E06C 7/188; E06C 7/48; E06C 1/34; E06C 7/482; E06C 7/486; E06C 7/488; E06C 1/04; E04G 5/041; E04G 5/06; E04G 5/061; A47F 7/0028; E05B 73/00
USPC .......................................... 248/237; 182/107
See application file for complete search history.

(56) References Cited

U.S. PATENT DOCUMENTS 1,450,694 A * 4/1923 Mahoney .................. E06C 7/42 182/93
1,508,392 A * 9/1924 Heun ........................ E06C 7/48 248/210
1,543,551 A * 6/1925 Couche ..................... E06C 7/48 182/214
2,212,384 A * 8/1940 Brandel ................ B66C 23/203 212/292

(Continued)

FOREIGN PATENT DOCUMENTS

DE 3514003 A1 * 10/1986 ........... E04D 13/064
DE 202022002437 U1 * 7/2023 ............... E06C 7/48

(Continued)

*Primary Examiner* — Taylor Morris

(57) ABSTRACT

An apparatus for restraining the movement of a ladder is disclosed. The apparatus is formed of plate which can be attached to roof of a structure using nails or other fastening devices. In one embodiment of the present invention, the plate has a stationary bracket which extends from an edge of the plate. A movable bracket is attached to the plate which also has a portion that extends from the edge of the movable bracket. The stationary bracket and the moveable bracket cooperate to receive and retain the respective side support rails of a ladder when the ladder is leaned against a structure. In a second embodiment, both brackets are movable.

11 Claims, 7 Drawing Sheets

(56) References Cited

U.S. PATENT DOCUMENTS 2,327,317 A * 8/1943 Randall .................... E06C 7/44 182/214
2,710,129 A * 6/1955 Telech .................... E06C 7/48 248/210
3,288,249 A * 11/1966 Gibson .................... E06C 7/48 182/214
3,779,344 A * 12/1973 Rister .................... E06C 7/48 182/120
4,502,566 A * 3/1985 Wing .................... E06C 7/48 182/214
4,580,661 A * 4/1986 Thomson, Jr. .......... E06C 7/486 182/206
4,643,275 A * 2/1987 LeBlanc .................... E06C 7/48 182/206
4,678,061 A * 7/1987 Jordan .................... E06C 1/345 182/206
4,813,515 A * 3/1989 Wigington .............. E06C 7/486 248/48.2
5,215,163 A * 6/1993 Kent, Sr. ................. E06C 7/486 182/229
5,509,500 A * 4/1996 Delagera ................. E06C 7/081 182/214
5,638,916 A * 6/1997 Schneider ................. E06C 1/34 182/116
5,645,258 A * 7/1997 Flowers ................. A47C 21/00 248/501
5,743,356 A * 4/1998 Mitchell .................... E06C 7/48 182/229
5,971,100 A * 10/1999 DeLeon .............. E04G 21/3276 182/214
6,029,774 A * 2/2000 Cothern .................. E06C 7/188 182/214
6,044,930 A * 4/2000 Hayman .................... E06C 1/34 182/206
6,050,533 A * 4/2000 Cruz .................... E04G 3/18 248/231.71
6,244,551 B1 * 6/2001 Fletcher .................. E06C 7/486 52/11
6,354,401 B2 * 3/2002 Murray .................... E06C 1/34 248/48.1
6,513,286 B2 * 2/2003 Vierra .................... E04D 13/158 33/495
6,578,665 B1 * 6/2003 DeBaca .................... E06C 1/34 182/214
6,691,829 B1 * 2/2004 Stelmach ................ E06C 7/486 52/11
6,722,469 B1 * 4/2004 Weger, Jr. ................ E06C 7/48 248/210
6,729,441 B1 * 5/2004 Nahlen .................... E06C 7/48 182/206
7,134,525 B1 * 11/2006 Ferris .................... E06C 7/486 182/206
7,726,445 B2 * 6/2010 Parnell .................... E04G 5/06 182/229
7,950,497 B2 * 5/2011 Horton .................... E06C 7/16 182/107
8,511,036 B2 * 8/2013 O'Donnell .......... E04G 21/3276 52/712
9,580,963 B1 * 2/2017 Wilkes .................... E06C 7/488
9,593,532 B2 * 3/2017 Dehoff .................... E06C 7/48
11,085,238 B1 * 8/2021 Bancroft ................ E06C 7/486
11,180,956 B2 * 11/2021 Gaines .................... E06C 7/182
2002/0134619 A1 * 9/2002 Schwenke ................ E06C 1/34 182/107
2005/0045421 A1 * 3/2005 Gaines .................... E06C 7/482 182/107
2006/0266583 A1 * 11/2006 Jones .................... E06C 7/48 182/214
2007/0278040 A1 * 12/2007 Rager .................... E06C 7/48 182/107
2008/0202851 A1 * 8/2008 Schwenke ................ E06C 7/48 182/107
2009/0000868 A1 * 1/2009 Gaines .................... E06C 7/482 182/106
2009/0242327 A1 * 10/2009 Tracy .................... E06C 7/486 182/107
2010/0116589 A1 * 5/2010 Mathieson .............. E06C 7/486 182/107
2010/0236865 A1 * 9/2010 Crowton .................. E06C 1/26 182/129
2011/0253479 A1 * 10/2011 Gandy .................... E06C 7/486 182/107
2012/0079786 A1 * 4/2012 O'Donnell .............. E04G 5/043 248/237
2016/0215563 A1 * 7/2016 Ellis .................... E06C 1/04
2017/0058605 A1 * 3/2017 Napolitano ............. E06C 7/488
2017/0356245 A1 * 12/2017 Surdo .................... E06C 7/48
2018/0016843 A1 * 1/2018 Milton .................... E06C 7/48
2019/0330921 A1 * 10/2019 James, Jr. ................ E06C 7/48
2020/0157885 A1 * 5/2020 Schneid .................. E06C 7/505
2021/0238925 A1 * 8/2021 MacKarvich ........... E06C 7/484

FOREIGN PATENT DOCUMENTS

FR 1598516 A * 7/1970 ............... E06C 7/48
GB 2254097 A * 9/1992 ............... E06C 7/48
IT TV20120016 A1 * 7/2013 ............... E06C 7/48
IT TV20120017 A1 * 7/2013 ............... E06C 7/48
IT TV20120018 A1 * 7/2013 ............... E06C 7/48
WO WO-2007092862 A2 * 8/2007 ............... E06C 1/34
WO WO-2024247176 A1 * 12/2024 ............... E06C 7/48

* cited by examiner

Prior Art

APPARATUS FOR RESTRAINING MOVEMENT OF A LADDER

CROSS REFERENCE TO RELATED APPLICATION

This application claims priority to provisional application No. 62/614,863 entitled "An Apparatus For Restraining Movement Of A Ladder" filed on Jan. 8, 2018, which is incorporated herein by reference.

TECHNICAL FIELD

The present invention generally relates to the field of safety devices and more particularly, is directed to an apparatus for restraining the movement of the ends of a ladder to help prevent the ladder from moving and causing injury to a person standing on the ladder or someone in close proximity to the ladder.

BACKGROUND

Ladders are typically used to gain access to elevated locations or surfaces and come in various shapes and sizes.

As illustrated in FIG. 1, a step ladder is a free standing structure with wide flat steps 1 positioned between one of two pairs of legs 2 and 3 which are hinged at a top 4. Step ladders are used to safely reach relatively low elevated locations or surfaces.

FIG. 2 illustrates a further embodiment of a ladder that is comprised of a pair of parallel side rails 21 and 22 that are held together by a plurality of spokes or steps 23. Ladders of the type illustrated in FIG. 2 are typically used to reach higher locations and surfaces than the customary step ladder.

For still higher locations and surfaces, an extension ladder such as illustrated in FIG. 3 is used. An extension ladder is comprised of two sections 31 and 32, such as the type illustrated in FIG. 2, arranged so that they fit together or extends on a sliding mechanism almost to the full length of the two sections. Thus, extension ladders provide a range of height adjustment dependent on the height of the location or surface to be reached.

A great deal of care must be exercised when using ladders of any type due to the likelihood of falling. Ladder related accidents, such as falls, can lead to serious injury.

The consequences of falls are magnified by the height of the structure on which a ladder is used. For example scaling a ladder to reach the roof of a building represents a substantial risk of falling. More importantly, the risk is increased if the ladder is not restrained from moving at it lower and upper ends. The present invention addresses this safety concern.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

A preferred embodiment of the present invention will be described with further reference to the drawings.

Figure 4:
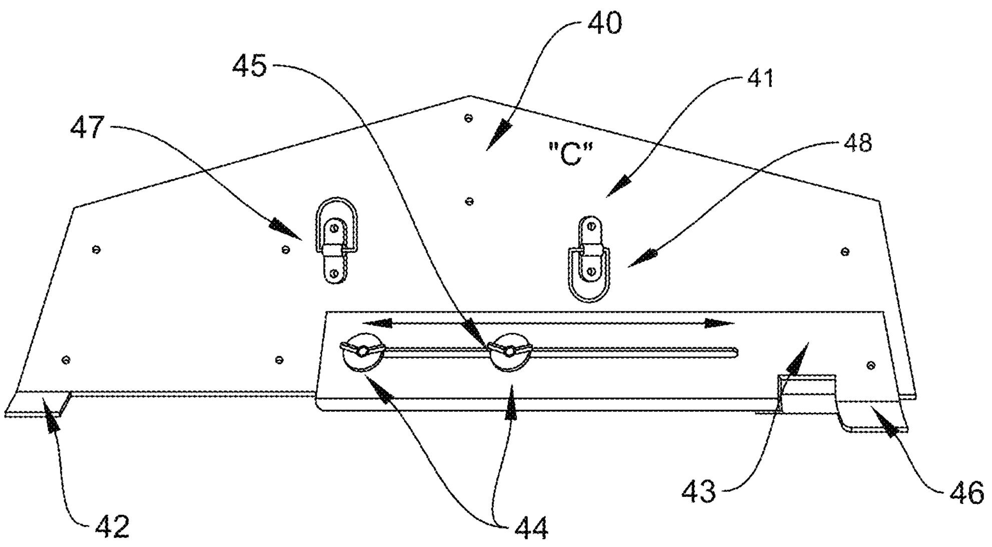
FIG. 4 is a top view of one embodiment of an apparatus for restraining the movement of a ladder in accordance with the present invention.

FIG. 4 illustrates one embodiment of an apparatus for restraining the movement of a ladder in accordance with the present invention.

Figure 6:
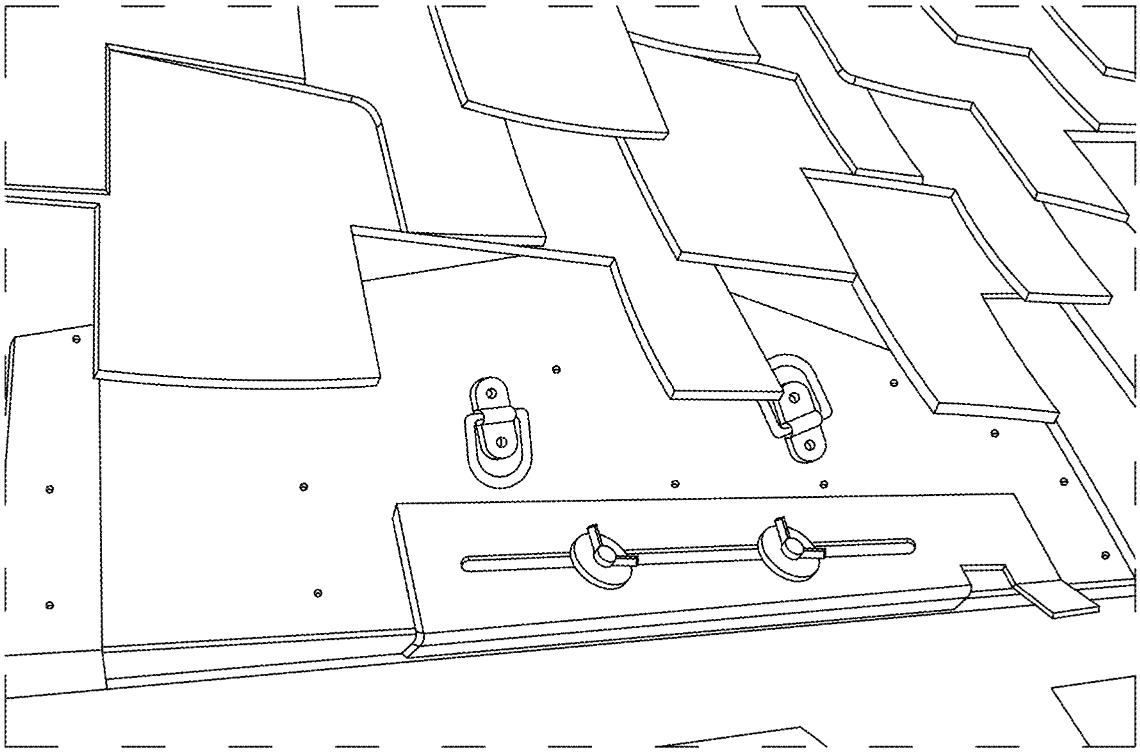
FIG. 6 is an illustration of the embodiment of the present invention as shown in FIG. 4 in use on a roof.
Figure 7:
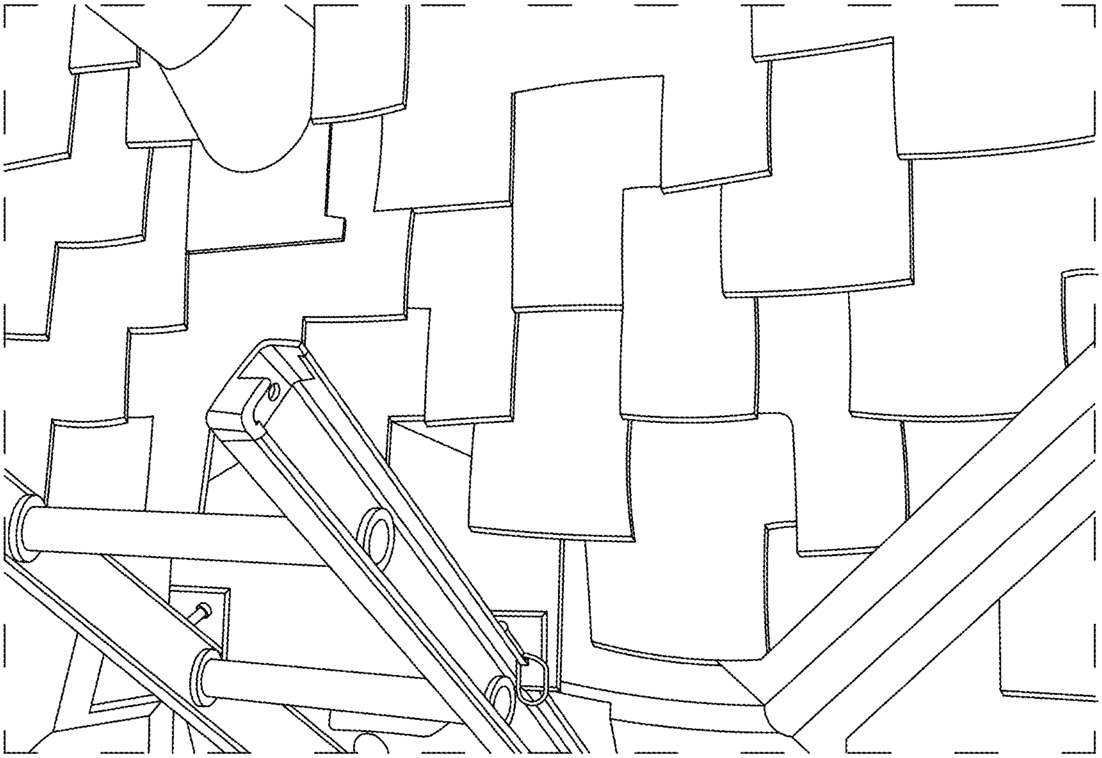
FIG. 7 is an illustration of the embodiment of the present invention as shown in FIG. 5 in use on a roof.

As shown in FIG. 4, the apparatus comprises a plate 40 having a plurality of apertures or holes 41 which allow plate 40 to be temporarily nailed or otherwise secured, for example, to the edge of a roof as shown in FIGS. 6 and 7.

Plate 40 also includes a ladder retraining tab 42 which projects outward from the edge of plate 40.

The apparatus further includes a slotted ladder lock bar 43 which is attached to plate 40 with one or more fasteners 44. Fasteners 44 can be tighten down to secure bar 43 in one of a number of lateral positions about plate 40 as indicated by arrow 45.

Bar 43 also has a ladder retraining tab 46 which projects out from plate 40.

As also illustrated in FIG. 4, a pair of anchor points 47 and 48 is provided which form a rotatable retainer to which a strap, rope or other device may be attached for holding the apparatus during transport or carrying to a roof top for installation.

Figure 1:
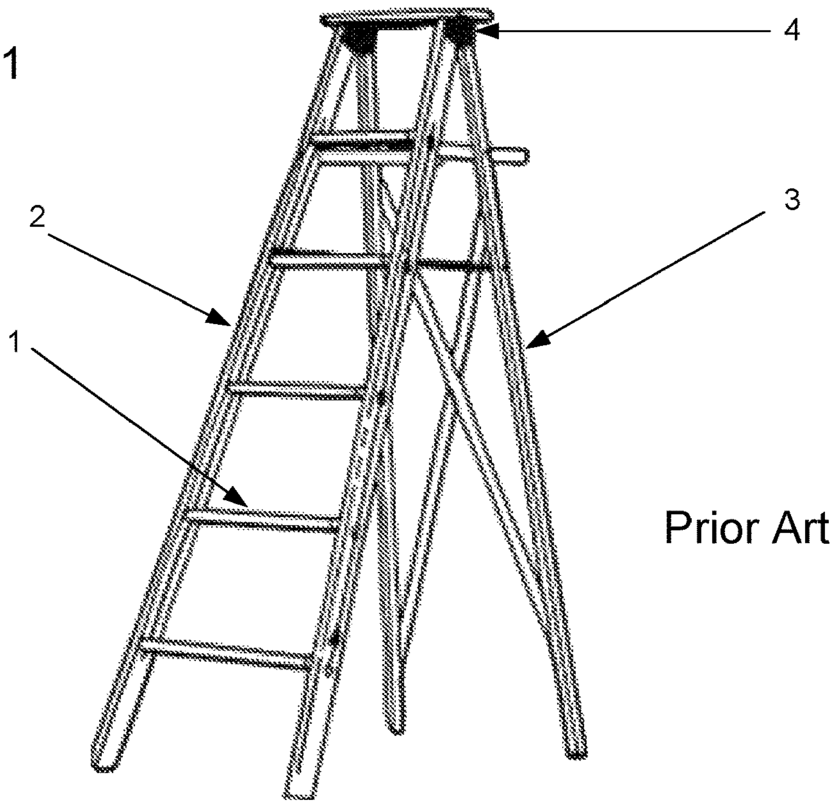
FIG. 1 illustrates one embodiment of a step ladder as known in the prior art.
Figure 2:
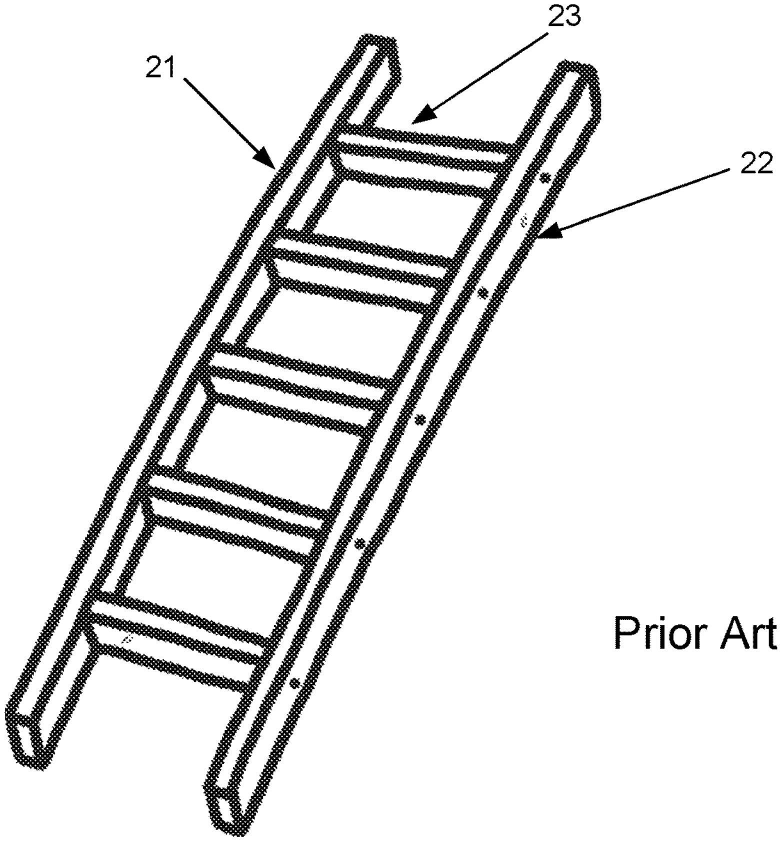
Prior Art Figure 2
FIG. 2 illustrates one embodiment of a ladder as known in the prior art.
Figure 3:
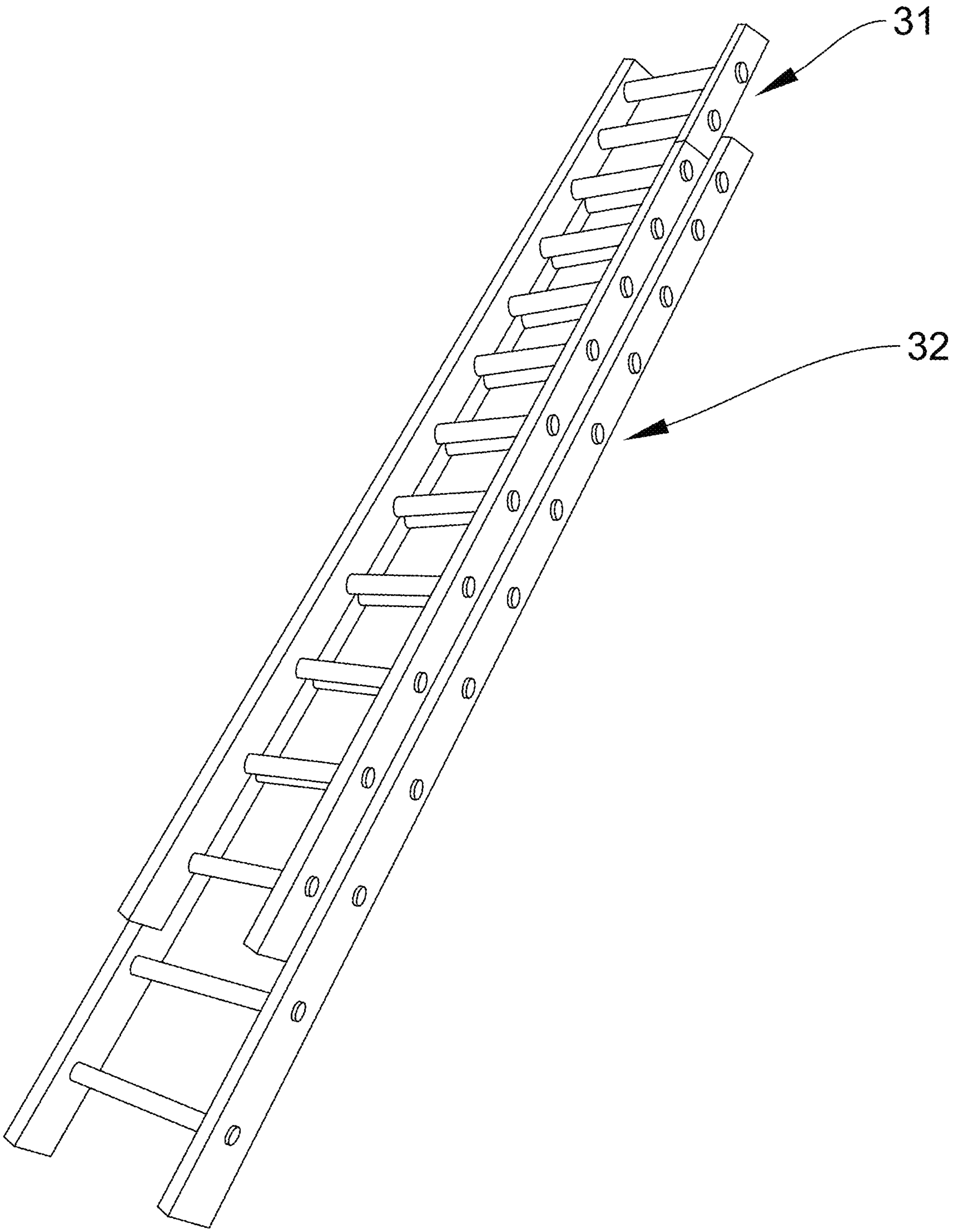
Prior Art FIG. 3
FIG. 3 illustrates one embodiment of an extension ladder as known in the prior art.

When a ladder is leaned against a building with plate 40 in place, the side rails of the ladder, for example rails 21 and 22 as shown in FIG. 2 (or the side rails of ladder 31 as shown in FIG. 3) are positioned between ladder retaining tabs 42 and 46 and the location of lock bar 43 is adjusted accordingly along arrow 45 to prevent the top end of the ladder from moving. Lock bar 43 may then be secured in position by fasteners 44. Thus, the elevated end of the ladder can be stabilized, making the ladder safer to use.

The present invention may also be used to stabilize the lower end of the latter in a similar fashion.

Figure 5:
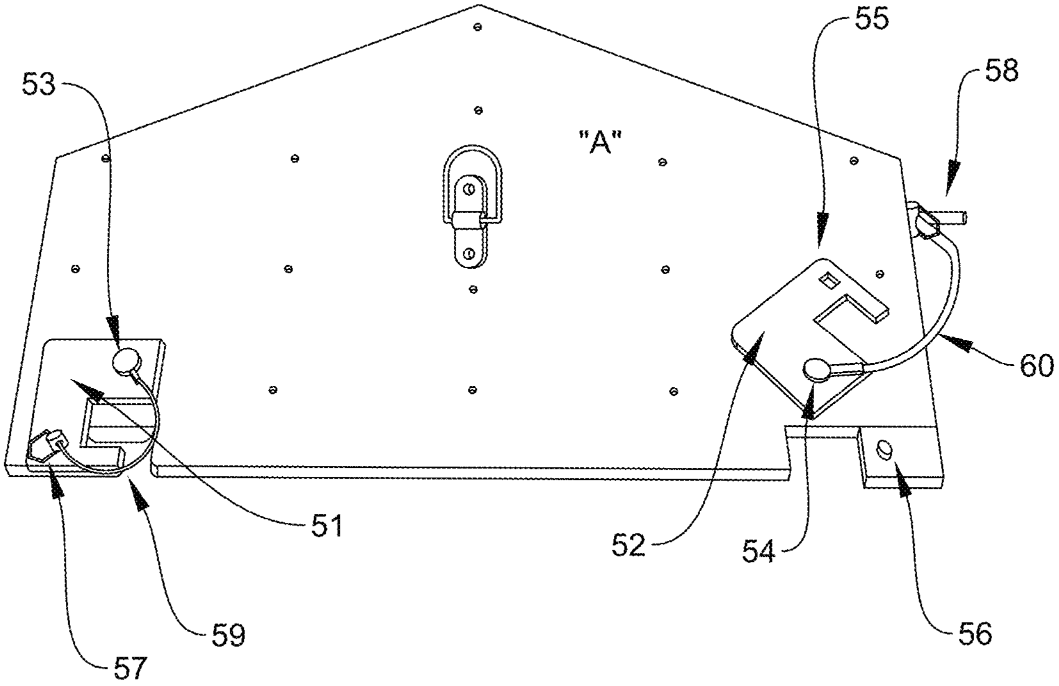
FIG. 5 is a top view of a further embodiment of an apparatus for restraining the movement of a ladder in accordance with the present invention.

FIG. 5 illustrates a further embodiment of an apparatus for restraining the movement of a ladder. In this embodiment, a pair of pivoting ladder rail locks 51 and 52 is used to secure the side rails of a ladder as shown in FIG. 7.

Rail locks 51 and 52 have respective pivot points 53 and 54 which, by way of example only, may be formed of a nut and bolt combination or a rivet. Thus, rail locks 51 and 52 rotate about these pivot point so that the rail locks can be rotated into place in order to secure the side rails of the ladder to the apparatus as shown in FIG. 7. Thus, the end of the ladder is locked to the apparatus in order to prevent lateral movement of the ladder.

Rail locks 51 and 52 include a hole 55 which overlaps a corresponding hold 56 when the rail locks are moved into place to lock the side rails of the ladder. Pins 57 and 58 may then be inserted through the respective holes to prevent the rail locks from moving. As shown in FIG. 5, pin 57 is already inserted in its respective holes 55 and 56.

To insure that the pins 57 and 58 do not become lost or misplaced, they are secured to the apparatus with respective cords 59 and 60 as shown in FIGS. 5 and 7. Cords 59 and 60 may be made of steel braided cable incased in plastic or other suitable materials.

Figure 8A:
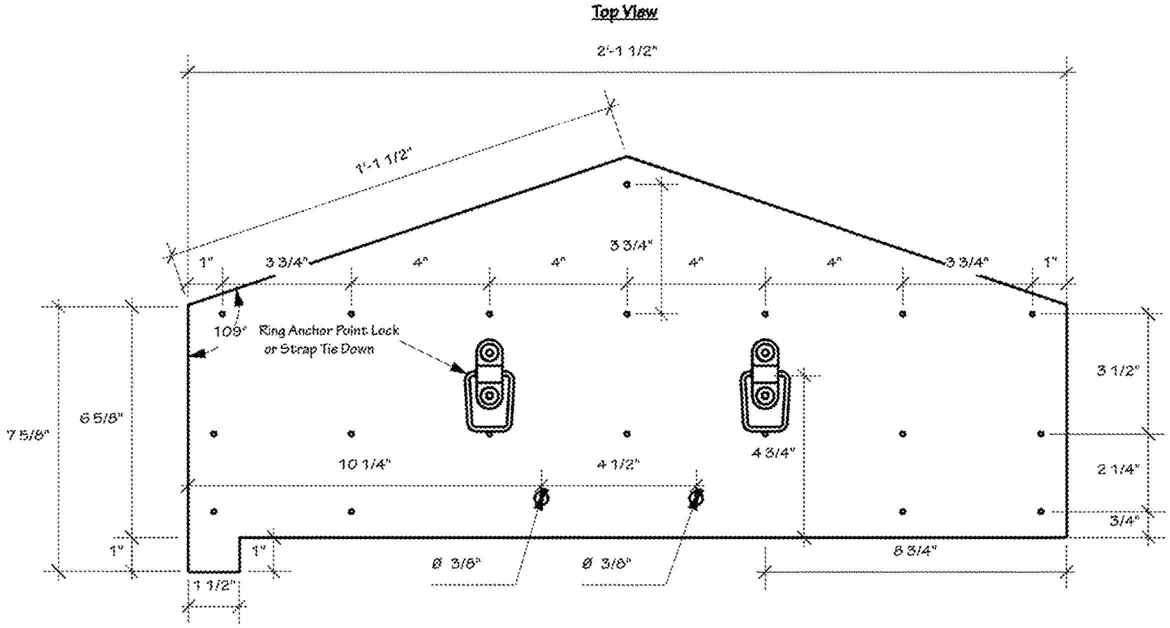
FIGS. 8-10 are dimensional construction diagrams of the embodiments of the present invention as shown in FIGS. 4 and 5.
Figure 8B:
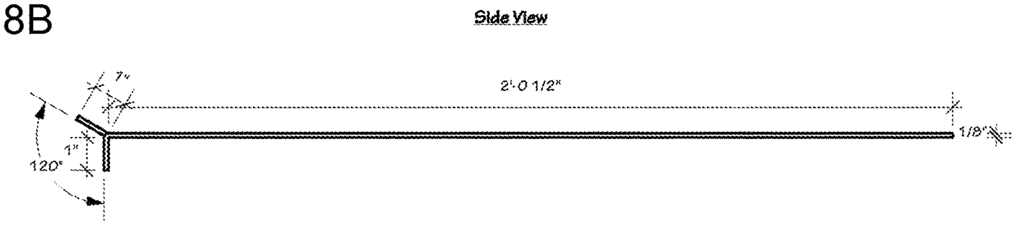
Figure 9A:
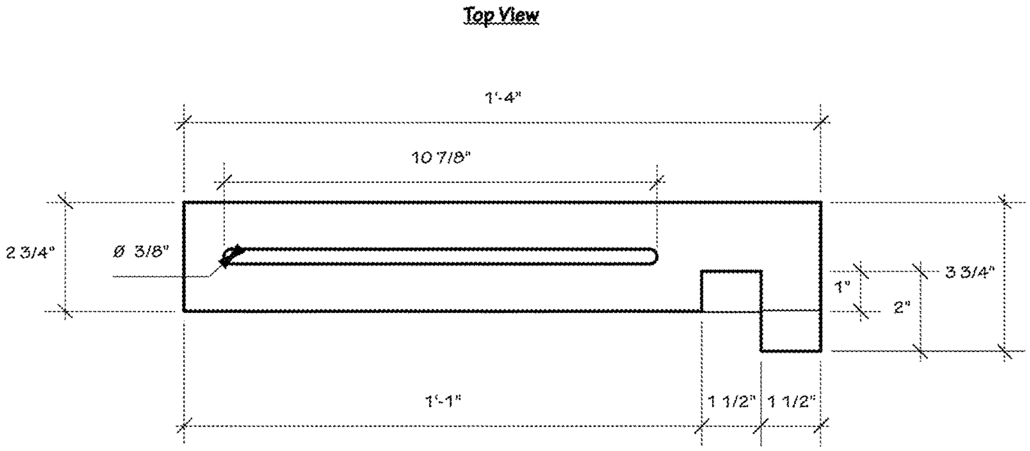
Figure 9B:
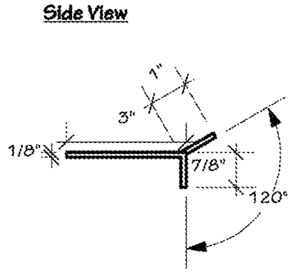
Figure 10A:
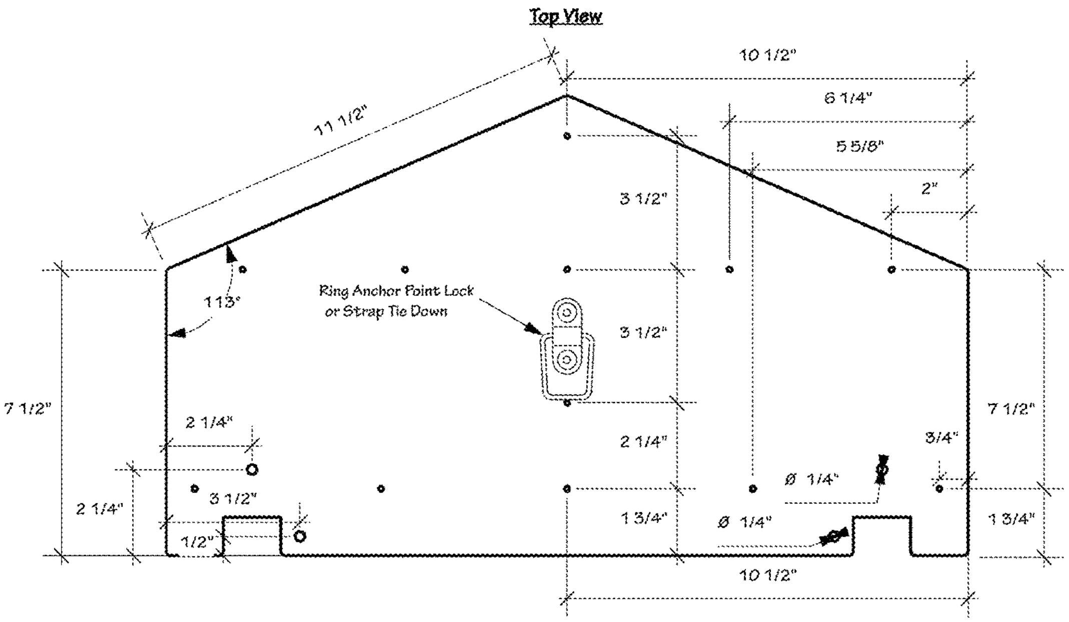
Figure 10B:
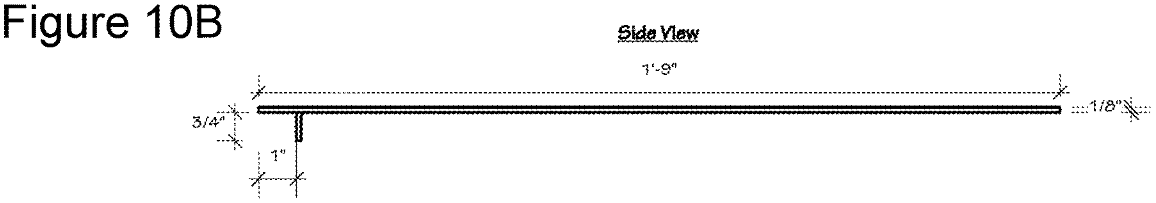
Figure 10C:
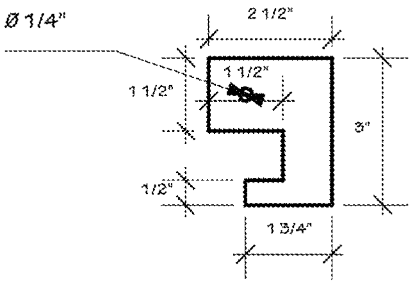

FIGS. 8-10 dimensionally illustrate the construction of the embodiments of applicant's apparatus for restraining movement of a ladder as shown in FIGS. 4-7.

The various elements of the apparatus may be fabricated from a number of materials, including metals, plastics and composites as one of ordinary skill in the art would understand.

While the foregoing specification teaches the principles of the present invention, with examples provided for the purpose of illustration, it will be appreciated by one skilled in the art from reading this disclosure that various changes in form and detail can be made without departing from the true scope of the invention.

I claim:

1. An apparatus for restraining the movement of a ladder, said apparatus comprising:

a generally flat plate having a top and a bottom surface and being adapted for attachment to the roof of a structure, said plate having a stationary tab formed from said plate and extending from an edge of said plate and being flared upward from said plate;

a movable tab adapted for attachment to said plate, said movable tab having a portion thereof that extends from an edge of said plate, said portion being flared upward from a plane of said plate; and wherein said stationary tab and said moveable tab cooperate to receive and retain respective side edges of a ladder when said ladder is leaned against said structure.

2. The apparatus of claim 1, wherein said plate includes a plurality of holes for securing said plate to said roof using a fastening device.

3. The apparatus of claim 2, wherein said fastening device is a nail.

4. The apparatus of claim 1, wherein said movable tab includes an elongated slot through which said movable tab is attached to said plate using a fastening device.

5. The apparatus of claim 4, wherein said fastening device is a nut and bolt.

6. An apparatus for restraining the movement of a ladder, said apparatus comprising:

a generally continuously flat plate having a top and a bottom surface and being adapted for attachment to the roof of a structure, said plate having first and second rotating rail locks mounted adjacent said top surface and when rotated to a first position extends from an edge of said plate and when rotated to a second position does not extend from the edge of said plate; and wherein when said first and second rotating rail locks are rotated to said first position said rotating rail locks cooperate to receive and retain the respective side support rails of a ladder when said ladder is leaned against said structure.

7. The apparatus of claim 6, wherein said plate includes a plurality of holes for securing said plate to said roof using a fastening device.

8. The apparatus of claim 7, wherein said fastening device is a nail.

9. The apparatus of claim 6, wherein said first and second rotating rail locks are rotatably attached to said plate using a fastening device.

10. The apparatus of claim 6, wherein said first and second rotating rail locks and said plate have a respective locking device that locks said first and second rotating rail locks in said first position.

11. The apparatus of claim 6, wherein a respective locking device is formed of a pin inserted through corresponding holes in said first and second rotating rail locks.

* * * * *